3,370,078
PROCESS FOR PREPARING ISOCYANATES
Robert Putnam Bennett, Bridgewater Township, Somerset County, and William Baptist Hardy, Bound Brook, N.J., assignors to American Cyanamid Company, Stamford, Conn., a corporation of Maine
No Drawing. Filed Dec. 18, 1964, Ser. No. 419,609
2 Claims. (Cl. 260—453)

ABSTRACT OF THE DISCLOSURE

A process for making an isocyanate which comprises reacting carbon monoxide with an azide of the formula:

$$R\text{—}(N_3)_n$$

wherein R is alkyl of 1–20 carbon atoms, alkenyl of 2–20 carbon atoms, aralkyl having up to 12 carbon atoms, aryl having up to 20 carbon atoms and a heterocycle of 5–6 ring members in the heterocyclic ring, and $n$ as a positive integer of less than 3. The reaction is conducted at a temperature between about 130° and 250° C. and at a pressure above 100 p.s.i.

---

This invention relates to, and has for its object, a new process for making organic isocyanates. More particularly, it relates to a process whereby an organic azide of Formula I is reacted with carbon monoxide to give an isocyanate of Formula II according to the following reaction:

$$R\text{—}(N_3)_n + nCO \rightarrow R\text{—}(NCO)_n + nN_2$$
$$\quad\quad I \quad\quad\quad\quad\quad\quad\quad II$$

In the above reaction, R is a hydrocarbon radical such as alkyl of 1–20 carbons, alkenyl of 2–20 carbons, aralkyl having up to 12 carbons, aryl having up to 20 carbons and a heterocycle of 5–6 ring members in the heterocyclic ring, and $n$ an integer of less than 3 and each azido moiety of the azide is attached to a carbon atom.

In copending application Ser. No. 333,727, filed Dec. 26, 1963, now abandoned, there is disclosed a method for the preparation of organic isocyanates by reacting an aromatic nitro compound with carbon monoxide in the presence of a catalyst.

It has now been discovered that organic isocyanates can be made by a process which involves the reaction of an organic azide with carbon monoxide at super-atmospheric pressure and elevated temperature.

Both aliphatic and aromatic azides may be used in the practice of this invention. The azides may bear substituents such as alkyl, alkoxy, chloro, bromo, cyano, isocyanato, nitro, amino, alkanamido, carbamoyl, alkoxycarbonyl, sulfonamido, thio and sulfinyl radicals. It should be realized that some of these groups can subsequently react with the isocyanates but that this does not interfere with the initial reaction.

Monoazides include alkyl azides of up to 20 carbons, such as azidoethane (or ethyl azide), 2-azidopropane, 1-azidopropane, 1-azidohexane, 1-azidododecane, azidocyclohexane, azidomethyl isocyanate, 2-azidoethylamine, 3-azidopropionamide, ethyl 3-azidopropionate, etc.; alkenyl azides of 2–20 carbons such as azidoethylene (or vinyl azide), 3-azido-1-propylene (or allyl azide), etc.; aralkyl azides (normally of up to 12 carbons) such as α-azidotoluene (or benzyl azide), (2-azidoethyl)benzene, 1-(2-azidoethyl)naphthalene, etc.; aryl azides of 1, 2 or 3 or more rings and up to 20 carbons, such as azidobenzene (or phenyl azide), 4-azidotoluene, 3-azidotoluene, 4-azidoanisole, 1-azido-4-nitrobenzene, 1-azido-3-nitrobenzene, 1-azido-4-chlorobenzene, 1-azido-2-chlorobenzene, 1-azido-4-bromobenzene, 4-azidobenzonitrile, 4-azidobenzenesulfonamide, azidoanthracene, 2-azidodiphenyl, 1-azidonaphthalene, 2-azidonaphthalene and 1-azido-4-nitronaphthalene, and heterocyclic azides such as 8-azidocarbazole, 4-azido-6-methoxy-2-methyl-quinoline, azidothiophene, etc.

Diazides include alkylene diazides, such as 1,5-diazidopentane, 1,6-diazidohexane, 1,8-diazidooctane, 1,10-diazidodecane, etc.; arylene diazides, such as 1,4-diazidobenzene, 2,7-diazidonaphthalene, 4,4'-diazidobiphenyl, 4,4'-diazidodiphenylsulfide, 4,4'-diazidodiphenylsulfone, 2,4- and 2,6-diazidotoluene, 4,4'-diazido-3,3'-dimethylbiphenyl, 4,4'-diazidodiphenylmethane, etc.

No solvent is necessary for the reaction, but certain solvents facilitate the reaction. Suitable solvents include aromatic hydrocarbons (e.g., benzene and toluene), chlorinated aromatic hydrocarbons (e.g., chlorobenzene and ortho-dichloro-benzene), the "Freons," which are aliphatic fluorinated hydrocarbons such as 1,1,2-trichloro-1,2,2-trifluoroethane (Freon 113), etc.

The reaction is carried out in a pressure vessel such as an autoclave. The azido compound and solvent are charged to the vessel and carbon monoxide is introduced until the desired pressure is reached. By theory, one mole of CO is required for each azido group. In practice, a large excess is used. The vessel is then heated to and at the desired temperature until the reaction is essentially complete.

A pressure between 100, preferably at least 500, and about 15,000 p.s.i., or higher, is used. The reaction temperature is generally between 130° and about 250° C., preferably between 160° and 180° C.

When the reaction is completed, the product is separated from the solvent. The isocyanate can then be purified by any known method, such as by distillation.

In the following examples, the parts and percentages are by weight.

Example 1.—Phenylisocyanate

Carbon monoxide is introduced into an autoclave containing a solution of 5 parts of azidobenzene in 75 parts of 1,1,2-trichloro-1,2,2-trifluoroethane until a pressure of about 4,000 p.s.i. is reached. The autoclave is then heated with shaking to about 170° C. and 6,400 p.s.i. This temperature is maintained for about 15 minutes, followed by cooling to room temperature, venting and discharge of the contents of the autoclave. After removal of the solvent by distillation under reduced pressure, the isocyanate is purified by distillation under reduced pressure.

Example 2.—p-Tolyl isocyanate

Carbon monoxide is introduced into an autoclave containing a solution of 10 parts of p-azidotoluene in 75 parts of 1,1,2-trichloro-1,2,2-trifluoroethane until a pressure of about 4,000 p.s.i. is attained. The autoclave is heated at 170° C. for about 40 minutes. After removal of the solvent by distillation, the product is separated by distillation in vacuo.

Example 3.—p-Methoxyphenyl isocyanate

Carbon monoxide is introduced into an autoclave containing a solution of 10 parts of 4-azidoanisole in 75 parts of 1,1,2-trichloro-1,2,2-trifluoroethane until a pressure of 4,000 p.s.i. is attained. The autoclave is heated at 170° C. for about 45 minutes. After removal of the solvent by distillation in vacuo, the product is separated by distillation.

Example 4.—o-Tolylisocyanate

Carbon monoxide is introduced into an autoclave containing a solution of 5 parts of o-azidotoluene in 75 parts of 1,1,2-trichloro-1,2,2-trifluoroethane until a pressure of 4,000 p.s.i. is reached. The autoclave is then heated with shaking to about 170° C. This temperature is maintained for about 30 minutes, followed by cooling to room temperature, venting and discharging of the contents of the autoclave. After removal of the solvent by distillation, the isocyanate is purified by distillation under reduced pressure.

*Examples 5–13*

The general procedure of Example 1 is followed substituting equal amounts of the azido compounds of Table I for the azidobenzene. The corresponding isocyanate products are also shown in Table I.

TABLE I

| Example | Azido Compound | Isocyanate |
|---|---|---|
| 5 | o-Azidoanisole | o-Methoxyphenyl. |
| 6 | o-Azidochlorobenzene | o-Chlorophenyl. |
| 7 | p-Azidochlorobenzene | p-Chlorophenyl. |
| 8 | 1-azidonaphthalene | 1-naphthyl. |
| 9 | 2-azidonaphthalene | 2-naphthyl. |
| 10 | 3-azidocarbazole | 3-carbazolyl. |
| 11 | 1-azidohexane | Hexyl. |
| 12 | Azidocyclohexane | Cyclohexyl. |
| 13 | 1-azidododecane | Dodecyl. |

*Example 14*

Carbon monoxide is introduced into an autoclave containing a solution of 2 parts of 4,4′-diazidodiphenylmethane in 140 parts of 1,1,2-trichloro-1,2,2-trifluoroethane until a pressure of about 5,000 p.s.i. is reached. The autoclave is then heated with shaking to about 170° C. and this temperature is maintained for 30 minutes. The product, 4,4′-methylenebis(phenyl isocyanate), is separated by the procedure of Example 1.

*Examples 15–18*

The general procedure of Example 14 is followed substituting the diazido compounds of Table II for the 4,4′-diazidodiphenylmethane. The corresponding diisocyanate products are shown in Table II.

TABLE II

| Example | Diazido Compounds | Diisocyanate |
|---|---|---|
| 15 | 1,4-diazidobenzene | p-Phenylene. |
| 16 | 2,7-diazidonaphthalene | 2,7-naphthylene. |
| 17 | 4,4′-diazidobiphenyl | 4,4′-biphenylene. |
| 18 | 1,6-diazidohexane | Hexamethylene. |

We claim:
1. A process for making an isocyanate compound which comprises reacting carbon monoxide with an azide of the formula:

$$R-(N_3)_n$$ 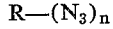

wherein R is selected from the group consisting of alkyl of 1–20 carbons, alkenyl of 2–20 carbons, aralkyl having up to 12 carbons, aryl having up to 20 carbons and a heterocycle of 5–6 members in the heterocyclic ring, $n$ is a positive integer of less than 3 and each azido moiety of said azide is attached to a carbon atom of R, said reaction being conducted at a temperature between about 130° and 250° C. and at a pressure of above 100 p.s.i. using at least one mole of carbon monoxide for each equivalent of azido moiety.

2. The process of claim 1 wherein the azide is an aryl azide of up to two carbocyclic rings.

References Cited

UNITED STATES PATENTS

| | | | |
|---|---|---|---|
| 2,544,709 | 3/1951 | Mason | 260—453 |
| 3,070,618 | 12/1962 | Drummond | 260—453 |

CHARLES B. PARKER, *Primary Examiner.*

D. H. TORRENCE, *Assistant Examiner.*